US008717335B2

(12) United States Patent
Kung et al.

(10) Patent No.: US 8,717,335 B2
(45) Date of Patent: May 6, 2014

(54) ACTIVE PHOTOSENSING PIXEL

(75) Inventors: Chen-Pang Kung, Jhongli (TW); Wen-Jen Chiang, Zhubei (TW)

(73) Assignee: Industrial Technology Research Institute

( * ) Notice: Subject to any disclaimer, the term of this patent is extended or adjusted under 35 U.S.C. 154(b) by 676 days.

(21) Appl. No.: 12/954,879

(22) Filed: Nov. 28, 2010

(65) Prior Publication Data

US 2011/0304598 A1 Dec. 15, 2011

(30) Foreign Application Priority Data

Jun. 15, 2010 (TW) .............................. 99119405 A

(51) Int. Cl.
*G06F 3/042* (2006.01)

(52) U.S. Cl.
USPC ........ 345/175; 345/173; 345/207; 178/18.09; 178/19.05

(58) Field of Classification Search
USPC ............. 345/175, 207, 173; 178/18.09, 19.05
See application file for complete search history.

(56) References Cited

U.S. PATENT DOCUMENTS 6,809,718 B2 * 10/2004 Wei et al. ...................... 345/102
6,927,433 B2 8/2005 Hynecek
7,423,639 B2 9/2008 Min
7,525,078 B2 * 4/2009 Fann .......................... 250/208.1
7,679,043 B2 * 3/2010 Kim ........................ 250/214 AL
2005/0200293 A1 * 9/2005 Naugler et al. ............... 315/149
2005/0212448 A1 * 9/2005 Shibusawa ................. 315/169.3
2006/0007248 A1 * 1/2006 Reddy et al. .................. 345/690
2006/0119718 A1 6/2006 Hur
2007/0080956 A1 4/2007 Fann
2008/0084366 A1 * 4/2008 Saito et al. ...................... 345/76
2008/0087796 A1 4/2008 Fann
2008/0121442 A1 * 5/2008 Boer et al. ................. 178/18.09
2008/0252618 A1 * 10/2008 Chung et al. .................. 345/175
2009/0101900 A1 4/2009 Chuang
2009/0179243 A1 7/2009 Fann
2010/0140455 A1 * 6/2010 Nathan et al. ............. 250/214 A
2010/0182467 A1 * 7/2010 Lee .............................. 348/294

FOREIGN PATENT DOCUMENTS

CN 101515594 A 8/2009
CN 101636691 A 1/2010
CN 101770316 A 7/2010
JP 09114584 5/1997

(Continued)

OTHER PUBLICATIONS

Eiji Kanda et al.; "Integrated Active Matrix Capacitive Sensors for Touch Panel LTPS-TFT LCDs"; Sid 08 Digest; 2008; pp. 834-837; ISSN-008-0966X/08/3902-0834.

(Continued)

*Primary Examiner* — Lun-Yi Lao
*Assistant Examiner* — Kelly B Hegarty
(74) *Attorney, Agent, or Firm* — Wang Law Firm, Inc.; Li K. Wang; Stephen Hsu

(57) ABSTRACT

An active photosensing pixel is disclosed, in which a two-terminal photosensing transistor has a first terminal coupled to a first node, a second terminal coupled to a selection line and a control terminal connected to the first terminal. A driving transistor has a first terminal coupled to a first reference voltage, a second terminal coupled to an output line and a control terminal connected to the first node.

28 Claims, 8 Drawing Sheets

(56) References Cited

FOREIGN PATENT DOCUMENTS

| | | | | |
|---|---|---|---|---|
| JP | 11-274524 | | | 10/1999 |
| JP | 11-331703 | | | 11/1999 |
| JP | 2000165754 | A | | 6/2000 |
| JP | 2008017288 | A | | 1/2008 |
| JP | 2008096523 | A | * | 4/2008 |
| JP | 2008191822 | | | 8/2008 |
| JP | 2008205870 | A | | 9/2008 |
| JP | 2009093050 | A | | 4/2009 |
| JP | 2009093154 | A | | 4/2009 |
| JP | 2009518661 | | | 5/2009 |
| JP | 2010004803 | A | | 1/2010 |
| JP | 2010038513 | A | | 2/2010 |
| JP | 2010067841 | | | 3/2010 |
| KR | 20070000579 | | | 1/2007 |
| KR | 1020090028206 | | | 3/2009 |
| TW | 200929119 | | | 7/2009 |
| WO | 2007001311 | A1 | | 1/2007 |
| WO | 2010004803 | A1 | | 1/2010 |
| WO | 2010038513 | A1 | | 4/2010 |

OTHER PUBLICATIONS

Office Action of corresponding JP application, issued Jul. 3, 2012.
Office Action of corresponding CN application, issued Sep. 28, 2012.
Office Action of corresponding KR application, issued on Oct. 25, 2012. Please aware that the cited KR 10-2007-0108386 in the English translation of the KR office action is incorrect and that the correctly cited publication is stated in the original KR office action.
Notice of Allowance of corresponding JP application, issued on Mar. 26, 2013.
Notice of Allowance of corresponding KR application, issued on May 21, 2013.
Office Action of corresponding CN application, issued on Mar. 28, 2013.
Office Action of corresponding TW application, issued on Aug. 12, 2013.

* cited by examiner

ACTIVE PHOTOSENSING PIXEL

CROSS REFERENCE TO RELATED APPLICATIONS

This application claims priority of Taiwan Patent Application No. 099119405, filed on Jun. 15, 2010, the entirety of which is incorporated by reference herein.

BACKGROUND

1. Field of the Disclosure

The present disclosure relates to a display, and in particular relates to a photosensing pixel display, wherein the photosensing pixel executes exposure and readout procedures at the same time when selection lines are selected.

2. Description of the Related Art

Lately, E-books have been developed and commercialized. One feasible display configuration for E-books, adopts a thin film transistor liquid crystal display (TFT-LCD) thereto. In other words, the E-book displays images by using electronic components, such as a TFT or photosensing device, disposed on a backplane thereof. E-books must have the ability to sense light so that drawing marks on a screen thereof may be accomplished. As an example, however, for an E-book with a photosensing function, since the photosensing device is installed under the backplane, light transmittance therethrough is decreased. Thus, E-Books need amount of time for exposure to draw marks on the screen thereof.

An active photosensing pixel which can quickly draw on the screen of E-books is desired.

BRIEF SUMMARY

A detailed description is given in the following embodiments with reference to the accompanying drawings.

An embodiment discloses an active photosensing pixel, comprising a two-terminal photosensing transistor, a driving transistor. The two-terminal photosensing transistor has a first terminal coupled to a first node, a second terminal coupled to a selection line and a control terminal connected to a first node. The driving transistor has a first terminal coupled to a first reference voltage, a second terminal coupled to an output line and the control terminal connected to the first node.

An embodiment discloses another active photosensing array, comprising a plurality of selection lines, output lines and active photosensing pixels. Each active photosensing pixel comprises a two-terminal photosensing transistor, a driving transistor. The two-terminal photosensing transistor has a first terminal coupled to a first node, a second terminal coupled to a selection line and a control terminal connected to a first node. A driving transistor has a first terminal coupled to a first reference voltage, a second terminal coupled to a corresponding output line and the control terminal connected to the first node.

An embodiment further discloses a photosensing method for an active photosensing pixel, wherein the active photosensing pixel comprises a two-terminal photosensing transistor having a first terminal coupled to a first node, a second terminal coupled to a selection line and a control terminal connected to a first node and a driving transistor having a first terminal coupled to a first reference voltage, a second terminal coupled to an output line and a control terminal connected to the first node. The photosensing method includes the following steps. First, a first voltage is provided to the selection lines, respectively, during an exposure and readout cycle, such that the two-terminal photosensing transistor functions as a photosensitive resistor. Next, a photosensing current is generated to charge the first node when the two-terminal transistor receives an incident light, such that the driving transistor is turned on according to a voltage level of the first node to produce an output current to the selection line.

BRIEF DESCRIPTION OF THE DRAWINGS

The present disclosure can be more fully understood by reading the subsequent detailed description and examples with references made to the accompanying drawings, wherein.

DETAILED DESCRIPTION

The embodiment will be explained as follows. The following description is made for the purpose of illustrating the embodiment and should not be taken in a limiting sense. The scope of the invention is best determined by reference to the appended claims.

Figure 1B:
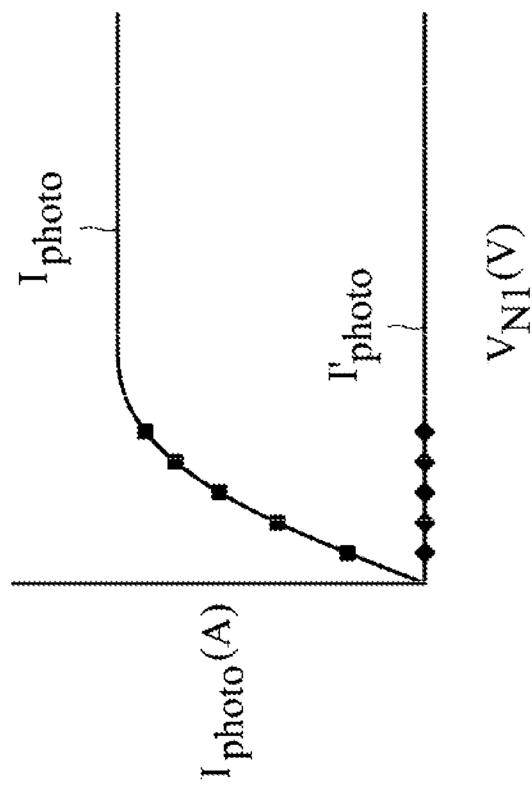
FIG. 1B is an embodiment of the relationship of the photosensing current $I_{photo}$ and the voltage $V_{N1}$ at the first terminal of the two-terminal photosensing transistor in the First operation mode.
Figure 1A:
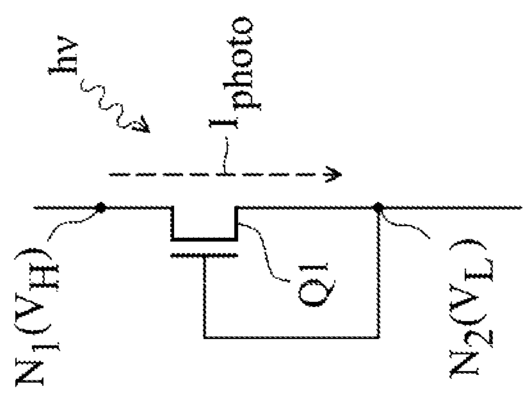
FIG. 1A is a schematic view showing an embodiment of the first operation mode for the two-terminal photosensing transistor.

FIG. 1A is a schematic view showing an embodiment of the two-terminal sensing transistor in a first operation mode. In this embodiment, the two-terminal photosensing transistor (written as $Q_1$ hereinafter) is an N-type a-Si:H but is not limited thereto. The two-terminal photosensing transistor $Q_1$ includes the first terminal $N_1$, the second terminal $N_2$ and a control terminal. Note that the control terminal of the two-terminal photosensing transistor $Q_1$ is connected to the second terminal $N_2$, wherein, it forms two terminals of the two-terminal photosensing transistor. That is, the first terminal $N_1$, and the second terminal $N_2$ which connected to the control terminal. In the first operation mode, the high voltage $V_H$ is applied to the first terminal $N_1$ of the two-terminal photosensing transistor $Q_1$ and the low voltage $V_L$ is applied to the second terminal $N_2$. The two-terminal photosensing transistor $Q_1$ produces the photosensing current $I_{photo}$ from the first terminal $N_1$ to the second terminal $N_2$ when the two-terminal photosensing transistor $Q_1$ receives the incident light hv in the first operation mode. Generally speaking, the intensity of the photosensing current $I_{photo}$ is determined by the surface dimensions of the semiconductor layer and material of the two-terminal photosensing transistor $Q_1$. Moreover, the intensity of the photosensing current $I_{photo}$ can also be determined by the intensity of the incident light hv. In other words, the stronger the incident light hv is, the greater the photosensing current $I_{photo}$ will be. Therefore, the two-terminal photosensing transistor $Q_1$ functions as a photosensitive resistor in the first operation mode. For other embodiments, the two-terminal photosensing transistor $Q_1$ can be a P-type a-Si:H TFT, but is not limited thereto. In other embodiments, the two-terminal photosensing transistor $Q_1$ may be bipolar junction transistor (BJT) or other switching devices.

FIG. 1B shows, during the first operation mode, the relationship of the photosensing current $I_{photo}$ and the voltage $V_{N1}$ at the first terminal of the two-terminal photosensing transistor $Q_1$. As shown in FIG. 1B, the magnitude of the photosensing current $I'_{photo}$ is zero (also named cut-off region) when there is no incident light by (the line connected by diamond points as shown). On the contrary, when the two-terminal photosensing transistor $Q_1$ receives incident light hv (indicated as the line that connected by the square points), the photosensing current $I_{photo}$ will linearly increase, before slowing down by degrees (known as the triode region), and finally, becoming saturated (known as the saturation region). Hence, the above description of the two-terminal photosensing transistor $Q_1$ is similar to the general field-effect transistor (FET). In one embodiment, the photosensing current $I_{photo}$ is around 7.5E-09A if the two-terminal photosensing transistor $Q_1$ receives the incident light and the level of the first terminal $N_1$ is 16V, and the photosensing current $I'_{photo}$ is around 0 A if the two-terminal photosensing transistor $Q_1$ receives no incident light and the level of the first terminal $N_1$ is 16V. It can be determined whether the two-terminal photosensing transistor $Q_1$ has received the incident light by detecting the photosensing current $I_{photo}$ during the first operation mode.

Figures 2A, 2B:
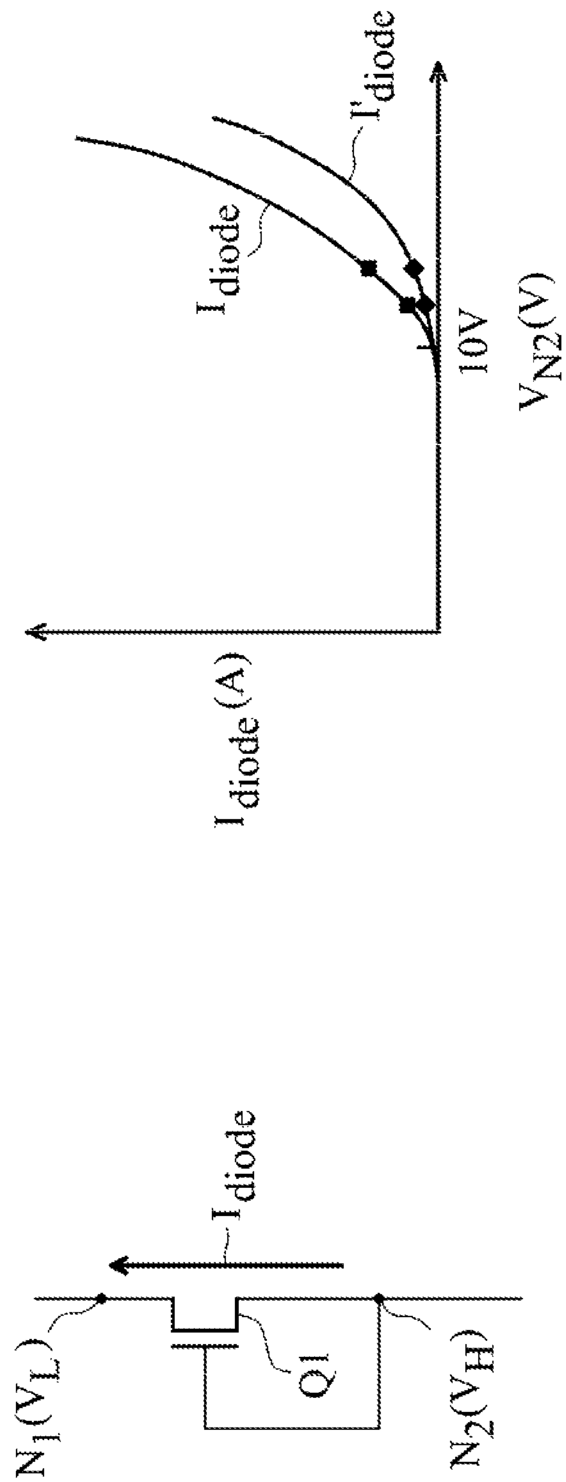
FIG. 2A is a schematic view showing an embodiment of the second operation mode for the two-terminal photosensing transistor.
FIG. 2B is an embodiment of the relationship of the diode current $I_{diode}$ and the voltage $V_{N2}$ at the second terminal of the two-terminal photosensing transistor in the second operation mode.

FIG. 2A is a schematic view showing an embodiment of the two-terminal photosensing transistor $Q_1$ under the second operation mode. Similar with FIG. 1A, the control terminal of the two-terminal photosensing transistor $Q_1$ is also connected to the second terminal $N_2$. Compared with the first operation mode, a low voltage $V_L$ is applied to the first terminal $N_1$ of the two-terminal photosensing transistor $Q_1$ and a high voltage $V_H$ is applied to the second terminal $N_2$ for the second operation mode. Because both the control terminal of the two-terminal photosensing transistor $Q_1$ and the second terminal $N_2$ are coupled to the high voltage $V_H$ (MOS diode), the two-terminal photosensing transistor $Q_1$, functions as a diode in the second operation mode and produces the diode current $I_{diode}$ (i.e. forward conducting current) through the second terminal $N_2$ to the first terminal $N_1$.

FIG. 2B shows the relationship between the diode current $I_{diode}$ and the voltage $V_{N2}$ under the second terminal of the two-terminal photosensing transistor in the second operation mode. Similar with the general diode, the diode current $I_{diode}$ of the two-terminal photosensing transistor $Q_1$ is zero at the beginning, and then exponentially increases after the two-terminal photosensing transistor $Q_1$ is turned on. After the two-terminal photosensing transistor $Q_1$ is conducted ($V_{N2}$>10V), whether the two-terminal photosensing transistor $Q_1$ receives or doesn't receive the incident light hv, will not change the existence of the diode current $I_{diode}$, flowing through the second terminal $N_2$ to the first terminal $N_1$. It should be noted that the photosensing current $I_{photo}$ with incident light hv (the square point as shown) is bigger than that of the current $I'_{photo}$ without incident light hv (the diamond point as shown). In one embodiment, the diode current $I_{diode}$ is around 1.0E-09A if the two-terminal photosensing transistor $Q_1$ receives the incident light and the second terminal $V_{N2}$ is 15V. Conversely, if the two-terminal photosensing transistor $Q_1$ has not received incident light and the second terminal $V_{N2}$ is at 15V, the diode current $I'_{diode}$ will be around 0.5E-09A. Therefore, the second operation mode has two functions: the first is to determine whether the two-terminal photosensing transistor $Q_1$ has received the incident light by detecting/determining the magnitude of the diode current; and the second, is to employ the diode current to discharge the second terminal $N_2$ (i.e., the positive charges on the second terminal $N_2$ flow to the first terminal $N_1$). Generally speaking, because the magnitude of the diode current $I_{diode}$ is much bigger than that of the photosensing current $I_{photo}$ (around 1.0E+03~1.0E+04 units), the process of discharging the second terminal $N_2$ by the diode current in the second operation mode is comparatively faster than that of charging the first terminal $N_1$ from the photosensing current in the first operation mode.

Figure 3:
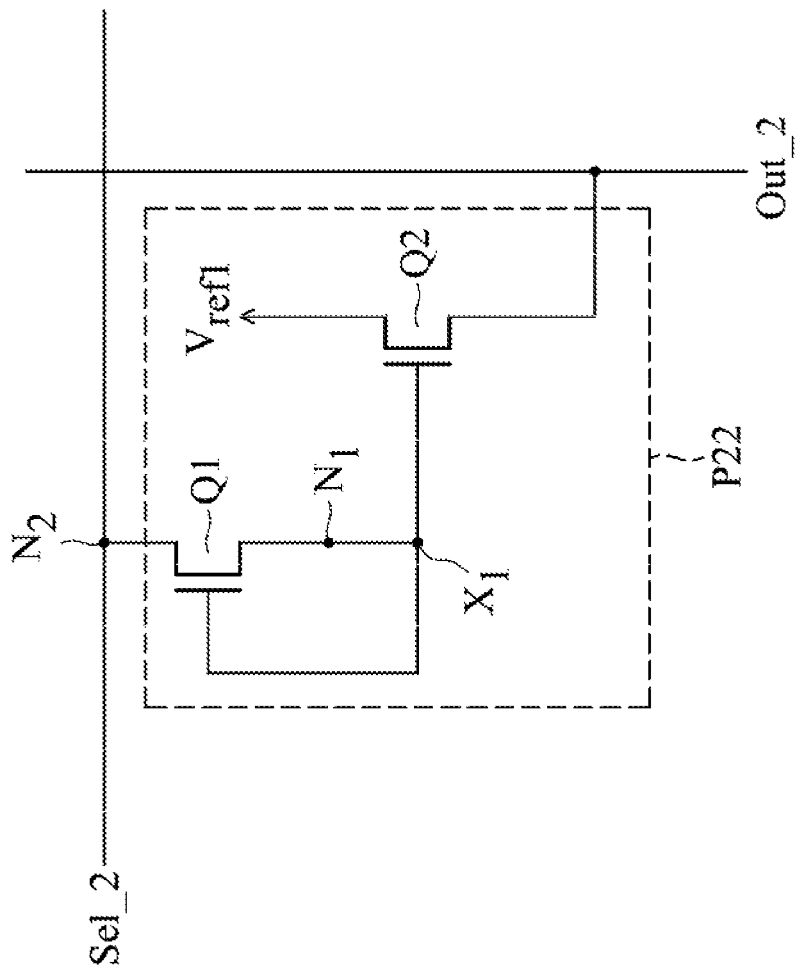
FIG. 3 is a schematic view showing an embodiment of the active photosensing pixel.

FIG. 3 is a schematic view showing the active photosensing pixel in one embodiment. In this embodiment, the active photosensing pixel $P_{22}$ comprises a two-terminal photosensing transistor $Q_1$ and a driving transistor $Q_2$. The active photosensing pixel $P_{22}$ is coupled between the selection line Sel_2 and the output line Out_2 perpendicular to the selection line Sel_2.

Figure 4:
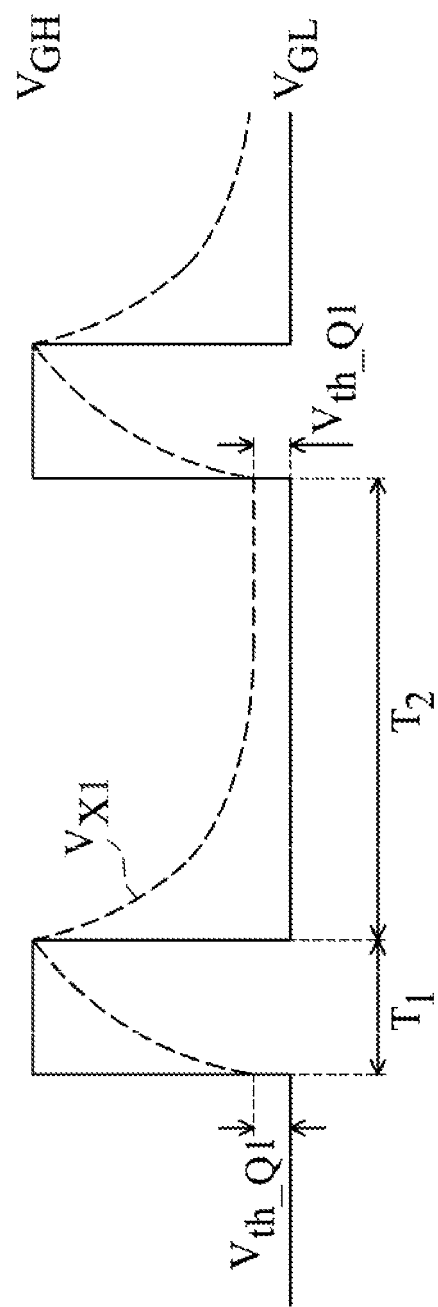
FIG. 4 is a sequence diagram showing an embodiment of the selection lines.

In the FIG. 3, the two-terminal photosensing transistor $Q_1$ has a first terminal $N_1$ coupled to the first node $X_1$, a second terminal $N_2$ coupled to the selection line Sel_2 and a control terminal connected to the first node $X_1$. The driving transistor $Q_2$ has a first terminal coupled to the first reference voltage, $V_{ref1}$, a second terminal coupled to the output line Out_2 and the control terminal connected to the first node $X_1$ Following, is a description of the photosensing measure. As the sequence diagram of the selection lines and the waveform of the first node $X_1$ shows in FIG. 4, the waveform of the first node $X_1$ comprises two situations for the active photosensing pixel $P_{22}$: one is receiving the incident light hv; and the other is not receiving the incident light hv. In FIG. 4, the solid lines represent the sequence diagram of the selection line Sel_2. The dotted line represents the voltage waveform of the first node $V_{x1}$ when the active photosensing pixel $P_{22}$ has received the incident light hv.

The following is a discussion about the operation mode of the two-terminal photosensing transistor. During the first cycle $T_1$ (known as the exposure and readout cycle), the selection line Sel_2 is pulled up to a high voltage (such as a high driving voltage $V_{GH}$) which is higher than that of the first node $X_1$. The incident light hv irradiates on the active photosensing pixel $P_{22}$, and the two-terminal photosensing transistor $Q_1$ functions as a photosensitive resistor and produces the photosensing current $I_{photo}$ according to the incident light by and further charges the first node $X_1$ to a high voltage $V_{X1}$. When the voltage $V_{X1}$, is higher than that of the threshold level of the driving transistor $Q_2$, the latter will be conducted by the voltage $V_{X1}$, and produce an output current to the output line, Out_2; hence, the first cycle $T_1$ is also a readout cycle. On the other hand, during the first cycle $T_1$, if the level of the selection line Sel_2 is pulled up to be higher than that of the first node X (such as a high driving voltage $V_{GH}$) and no incident light irradiates on the active photosensing pixel $P_{22}$, the two-terminal photosensing transistor $Q_1$ will not generate the photosensing current $I_{photo}$. From the description above, it is clear that the first operation mode of the two-terminal photosensing transistor $Q_1$ has been employed. Therefore, when the two-terminal photosensing transistor $Q_1$ functions as a photosensitive resistor, the threshold level of the driving transistor $Q_2$ is designed to be lower than (or equal to) a corresponding voltage generated by the driving transistor $Q_2$ on the first node $X_1$ while the incident light irradiates on the active photosensing pixel $P_{22}$, such that the driving transistor $Q_2$ is conducted by the photosensing current $I_{photo}$ and generates output current. Thus, determining whether the active photosensing pixel $P_{22}$ is irradiated by the incident light hv can be based on the output current generated by the active photosensing pixel $P_{22}$.

During the second cycle $T_2$ (normally named reset cycle), the level of the selection line Sel_2 is pulled to be lower than that of that of the level of the first node $X_1$ (such as the low driving voltage, $V_{GL}$), such that the two-terminal photosensing transistor $Q_1$ functions as a diode and discharges the voltage $Vx_1$ to the level of the selection line Sel_2 through the diode current $I_{diode}$, rapidly. When the first node voltage $V_{X1}$, on the first node is discharged to be lower than that of the threshold level of the driving transistor the driving transistor $Q_2$ is turned off.

For the second cycle $T_2$, since the driving transistor $Q_2$ is not conducted, the two-terminal photosensing transistor $Q_1$ does not produce the photosensing current, even though the incident light hv is irradiated thereupon. Note that the resetting of the voltage $V_{X1}$, at the first node $X_1$ is completed by means of the diode current $I_{diode}$ (i.e., the second operation mode) of the two-terminal photosensing transistor $Q_1$ in this embodiment. In this embodiment, the high driving voltage $V_{GH}$ of the selection line is 10V, and the low driving voltage $V_{GL}$ of the selection line is 0V. The voltage waveform at the first node $X_1$ is at least $V_{th\_Q1}$ higher than that of the low driving voltage $V_{GL}$, wherein, the $V_{th\_Q1}$ is the threshold level of the two-terminal photosensing transistor $Q_1$.

Figure 5:
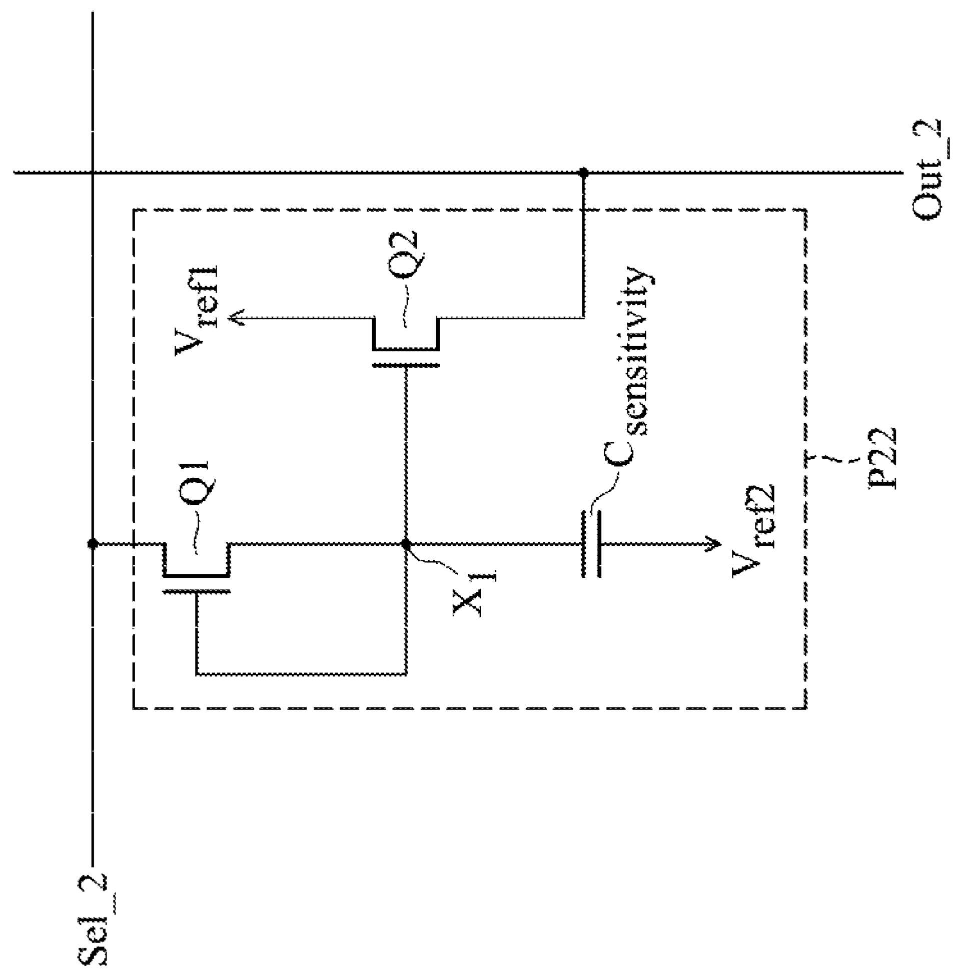
FIG. 5 is a schematic view showing another embodiment of the active photosensing pixel.

FIG. 5 is a schematic view of the active photosensing pixel. This embodiment is similar with FIG. 3. As such, for simplification, the circuit and sequence of selection lines will not be described in detail here. It should be noted that the active photosensing pixel $P_{22}$ may further comprise a sensitivity control capacitor $C_{sensitivity}$, wherein the sensitivity control capacitor $C_{sensitivity}$ has a first terminal connecting to the first node $X_1$ and a second terminal connecting to the second reference voltage $V_{ref2}$.

Following is the description for the function of the sensitivity control capacitor $C_{sensitivity}$. According to the descriptions above, by adjusting the voltage (i.e., $V_{X1}$, corresponding to the first node $X_1$) of the driving transistor $Q_2$, it can be determined whether the active photosensing pixel $P_{22}$ has received the incident light. In this embodiment, when the photosensing current $I_{photo}$ is high (meaning $\Delta V_{X1}$, is greatly differed), a sensitivity control capacitor $C_{sensitivity}$ with larger capacitance is employed, and when the photosensing current $I_{photo}$ is low (meaning $\Delta V_{X1}$ is differed slightly), the sensitivity control capacitor $C_{sensitivity}$ with smaller capacitance is employed. Therefore, even if the incident light hv is weak, resulting in a low diode current $I_{diode}$, the driving transistor $Q_1$ can still sense the weak incident light hv by employing a sensitivity control capacitor $C_{sensitivity}$ with small capacitance. Thus, compared with conventional method, this invention has a better signal-to-noise ratio (SNR).

Figure 6:
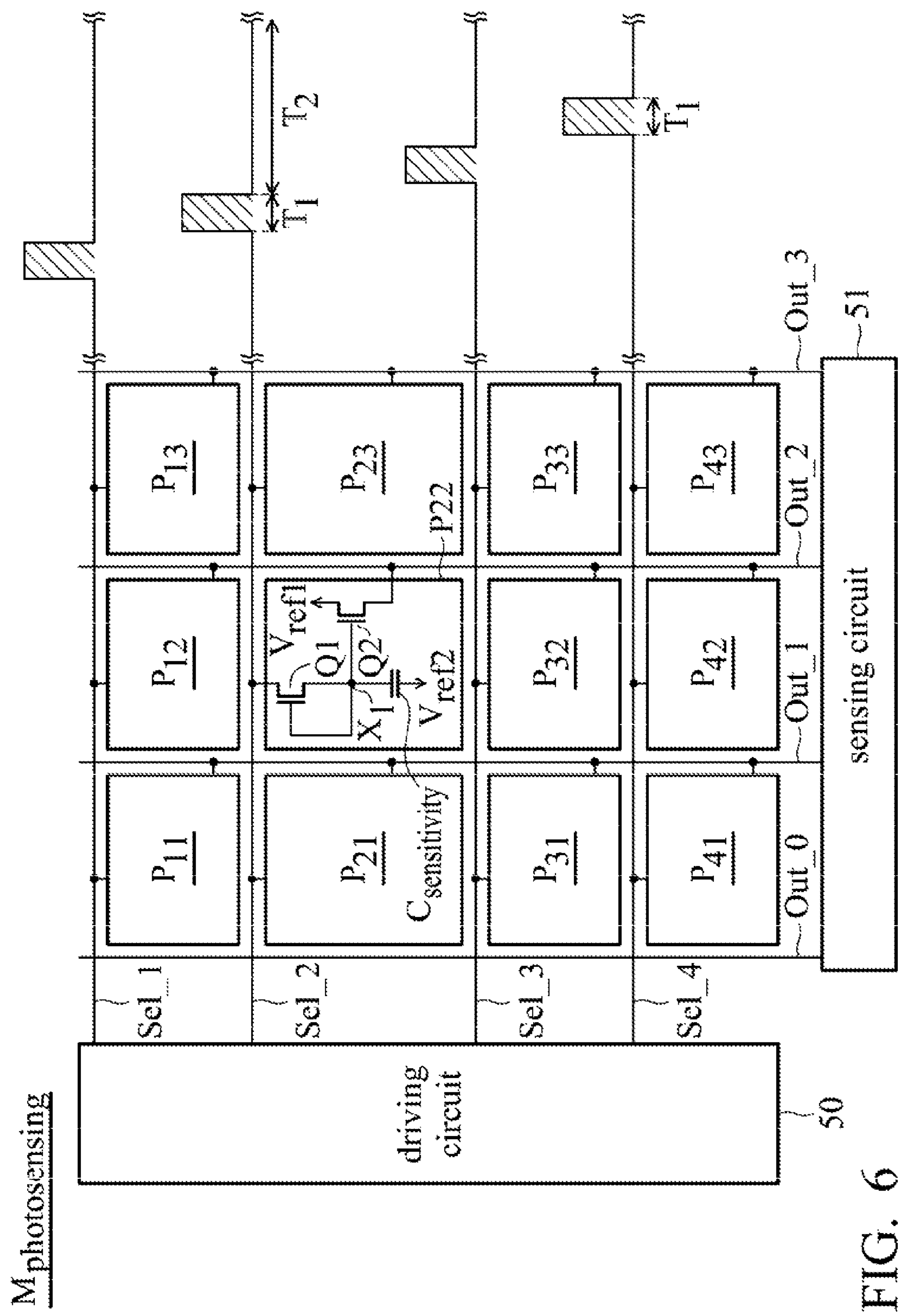
FIG. 6 is a schematic view showing an embodiment of the active photosensing array and a sequence diagram of the corresponding selection lines.
Figure 8:
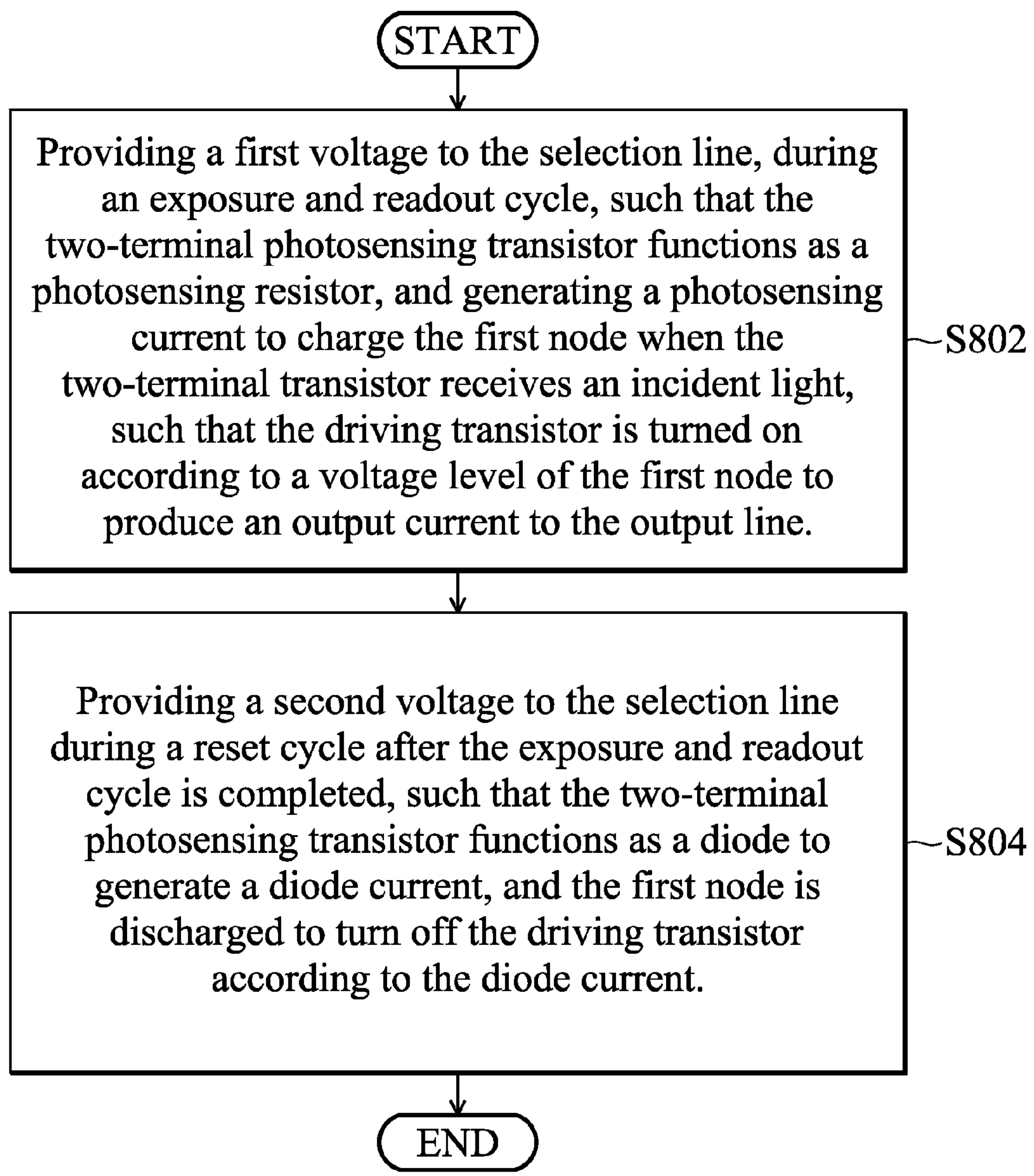

FIG. 6 is a schematic view showing the active photosensing array and a sequence diagram of the corresponding selection lines. The active photosensing array $M_{photosensing}$ comprises a plurality of selection lines Sel_1-Sel_4, a plurality of output lines Out_0-Out_3, a plurality of active photosensing pixels $P_{11}$-$P_{43}$, a driving circuit 50 and a sensing circuit 51. In this embodiment, each active photosensing pixel $P_{11}$-$P_{43}$ is similar with those of the embodiment in FIG. 5, in general, but is not limited thereto. In some embodiments, each of active photosensing pixels $P_{11}$-$P_{43}$ can also be the embodiment in FIG. 3. For simplification, the description of the circuit connection and the sequence diagram of the selection lines Sel_1-Sel_4 will not be described in detail. The driving circuit 50 may enable the selection lines Sel_1-Sel-4 in sequence according to corresponding selection signals. FIG. 8 is a flowchart of an embodiment of a photosensing method according to the disclosure. For example, in Step S802, for the first cycle $T_1$ (exposure and readout cycle), the selection line Sel_2 is pulled up to be higher than that of the first node $X_1$ (i.e. high driving voltage $V_{GH}$). Subsequently, the two-terminal photosensing transistor Q1 functions as a diode and produces the photosensing current $I_{photo}$ according to the intensity of the incident light hv, such that the first node $X_1$ is charged to the high voltage $V_{X1}/V'_{X1}$ by the photosensing current $I_{photo}$. In this embodiment, the two-terminal photosensing transistor $Q_1$ can not generate the photosensing current $I_{photo}$ when no incident light irradiates on the two-terminal photosensing transistor $Q_1$. When the voltage of the first node $X_1$ is higher than that of the threshold level of the driving transistor $Q_2$, the latter is conducted and produces an output current to the output line Out_2. Afterwards, the sensing circuit 51, by means of detecting or determining the output current, determines whether the active photosensing pixel $P_{22}$ has received the incident light hv. Thus, the first cycle $T_1$ is also the readout cycle. Next, in Step S804, for the second cycle, the voltage level of the selection line Sel_2 is pulled down to be lower than that of that of the first node $X_1$ (such as the low driving voltage $V_{GL}$), and the driving transistor $Q_2$ resets the latter by the diode current $I_{diode}$ of the two-terminal photosensing transistor $Q_1$ to turn off the driving transistor $Q_2$. Note that when the selection line Sel_2 is pulled up under the first cycle $T_1$, the selection lines Sel_1, Sel_3 and Sel_4 will be pulled low under the second cycle $T_2$. In other words, the scan array corresponding to the selection lines Sel_1, Sel_3 and Sel_4 will be turned off, so that the neighboring selection lines Sel_1 and Sel_3 of the selection line Sel_2 will not interrupt the selection line Sel_2. In other embodiments, the active photosensing array $M_{photosensing}$ includes at least four selection lines, three scan lines and the above and more than twelve photosensing pixels. Persons skilled in the art may design the active photosensing array $M_{photosensing}$ in accordance with product needs.

Figure 7:
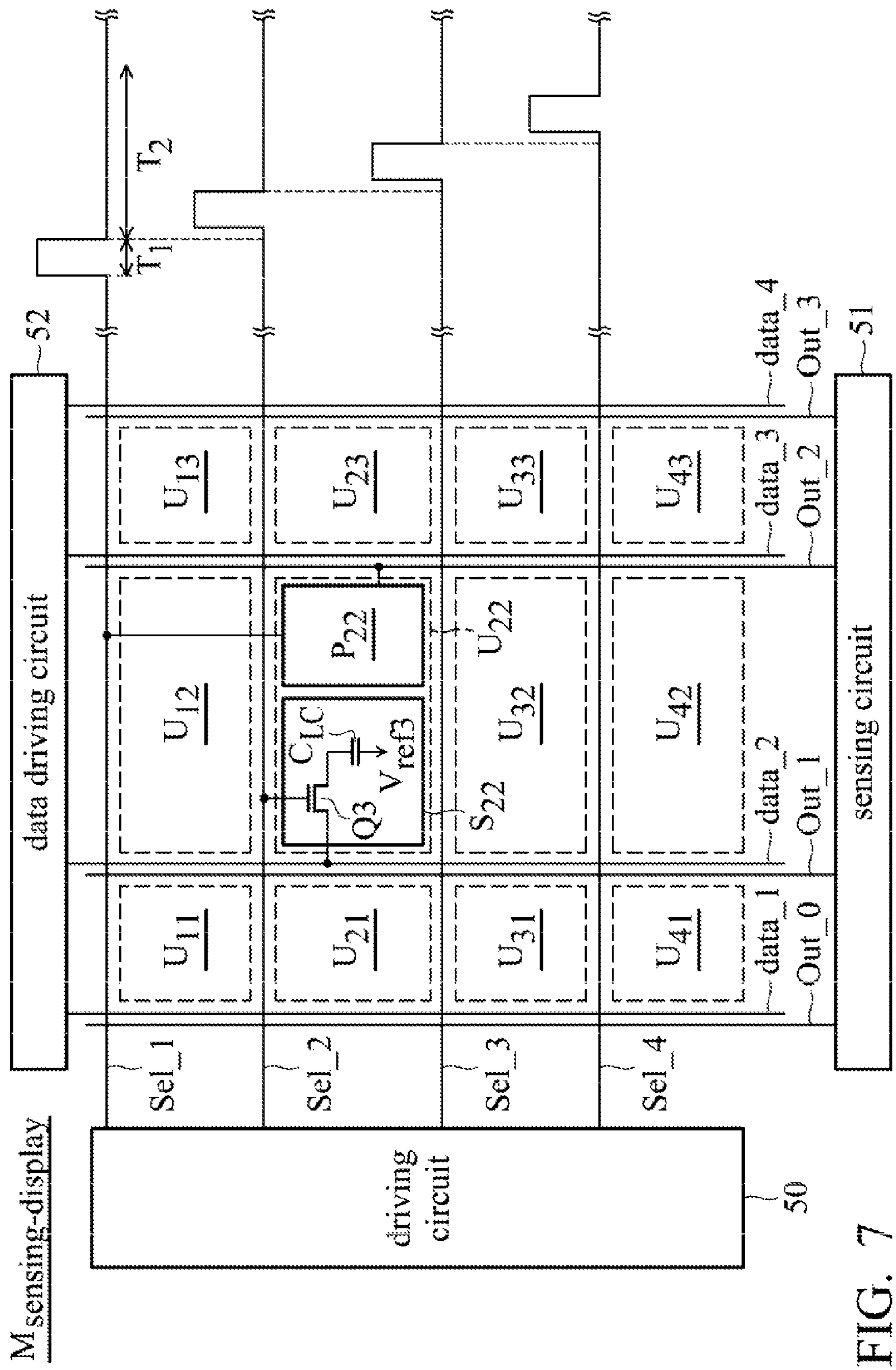
FIG. 7 is a schematic view showing an embodiment of the display with an active photosensing array and a sequence diagram of the corresponding selection lines.

FIG. 7 is a schematic view showing a display with an active photosensing array and a sequence diagram of the corresponding selection lines. The display with the active photosensing array $M_{sensing\text{-}display}$ comprises a plurality of selection lines Sel_1-Sel_4, a plurality of output lines Out_0-Out_3, a plurality of data lines data_1-data_4, a plurality of active photosensing and displaying units $U_{11}$-$U_{43}$, a driving circuit 50, a sensing circuit 51 and a data driving circuit 52. As shown in FIG. 7, each of the active photosensing and displaying units $U_{11}$-$U_{43}$ comprises an active photosensing pixel (as $P_{22}$) and a display pixel (as $S_{22}$), and thereamong, each of the active photosensing pixels can be installed in accordance with the above-said embodiments of this invention. Therefore, detailed descriptions of the active photosensing pixel and display pixel will be omitted here for brevity. With reference to the display pixel $S_{22}$, it comprises a switch transistor $Q_3$ and a liquid crystal capacitor $C_{LC}$, and thereamong, the switch transistor $Q_3$ comprises a first terminal coupled to the second data line data_2, a second terminal, and a control terminal coupled to the selection line Sel_2. Meanwhile, the liquid crystal capacitor $C_{LC}$ comprises a first terminal coupled to the second terminal of the switch transistor $Q_3$ and a second terminal coupled to a third reference voltage $V_{ref3}$.

The following is the discussion for the operation of the display with the active photosensing array. For example, for the first cycle, the voltage level of the selection line Sel_1 is pulled up to be higher than that of the first node $X_1$ of the photosensing pixel $P_{22}$ (i.e., the high driving voltage $V_{GH}$). Subsequently, the two-terminal photosensing transistor $Q_1$ functions as a photosensitive resistor and produces the photosensing current $I_{photo}$ according to the incident light hv, so that the first node $X_1$ is charged to a high voltage $V_{X1}$ by the photosensing current $I_{photo}$. When the voltage of the first node $X_1$ is higher than that of the threshold level of the driving transistor $Q_2$ voltage, the driving transistor $Q_2$ is turned on and produces an output current to the output line Out_2, and then, the sensing circuit 51, by means of detecting or determining the output current, determines whether the active photosensing pixel $P_{22}$ has received the incident light hv. Therefore, the first cycle $T_1$ is also the readout cycle. In this embodiment, when the voltage $Vx_1$, of the first node is higher than that of the threshold level of the driving transistor $Q_2$, the driving transistor $Q_2$ is turned on. On the contrary, when no incident light irradiates on the two-terminal photosensing transistor $Q_1$, the photosensing current $I_{photo}$ is not generated, such that the voltage $Vx_1$, of the first node $X_1$ is lower than the threshold level of the driving transistor $Q_2$. Thus, the driving transistor $Q_2$ is turned off.

Subsequently, during the second cycle $T_2$, the voltage of the selection line Sel_1 is pulled down to be lower than that of the first node $X_1$ (such as the low driving voltage $V_{GL}$). The voltage $V_{X_1}$, of the first node $X_1$ is reset by the diode current $I_{diode}$ of the two-terminal photosensing transistor Q1 to turn off the driving transistor $Q_2$. In addition, the driving circuit 50 enables the selection line Sel_2, so that the switch transistor $Q_3$ of the display pixel $S_{22}$ is turned on. Therefore, the active photosensing pixel $P_{22}$ is irradiated by the incident light hv according to the data received from the second data line data_2, to display the display pixel $S_{22}$.

The embodiments provide an active photosensing pixel and photosensing method. Compared with the conventional passive photosensing pixel, the photosensing pixels in the embodiments have higher signal-to-noise ratio and driving ability, which can meet the needs of large display dimensions. Moreover, the control terminal of the two-terminal photosensing transistor $Q_1$ is connected to the second terminal; therefore, variations in threshold level voltages of the two-terminal photosensing transistor $Q_1$ will not influence the display device. In the embodiments, the photosensing pixels and array can be disposed at the backplane of the display device and replace the conventional charge coupled device (CCD) photo sensor and the CMOS photo sensor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An active photosensing pixel, comprising:

a two-terminal photosensing transistor, having a first terminal directly coupled to a first node, a second terminal coupled to a selection line and a control terminal directly connected to the first terminal;

a driving transistor, having a first terminal coupled to a first reference voltage, a second terminal directly coupled to an output line and a control terminal directly connected to the first node; and a sensitivity control capacitor, having a first terminal directly connected to the first node and a second terminal connected to a second reference voltage which is different from the first reference voltage.

2. The active photosensing pixel as claimed in claim 1, wherein, during an exposure and readout cycle, a level of the selection line is pulled up to be higher than that of the first node, and the two-terminal photosensing transistor functions as a photosensitive resistor to produce a photosensing current according to an incident light, wherein the first node is charged by the photosensing current, such that the driving transistor generates an output current to the output line.

3. The active photosensing pixel as claimed in claim 2, wherein during a reset cycle after the exposure and readout cycle is completed, the level of the selection line is pulled down to be lower than that of the first node and the two-terminal photosensing transistor functions as a diode to produce a diode current, such that the first node is discharged to turn off the driving transistor.

4. The active photosensing pixel as claimed in claim 1, wherein the two-terminal photosensing transistor is an N-type a-Si:H TFT.

5. An active photosensing array, comprising:

a plurality of selection lines;

a plurality of output lines; and a plurality of active photosensing pixels, each including:

a two-terminal photosensing transistor, having a first terminal directly coupled to a first node, a second terminal coupled to a corresponding selection line and a control terminal directly connected to the first terminal; and a driving transistor, having a first terminal coupled to a first reference voltage, a second terminal directly coupled to a corresponding output line and a control terminal directly connected to the first node; and a sensitivity control capacitor having a first terminal directly connected to the first node and a second terminal connected to a second reference voltage which is different from the first reference voltage.

6. The active photosensing array as claimed in claim 5, wherein, during an exposure and readout cycle, a level of the corresponding selection line is pulled up to be higher than that of the level at the first node, and the two-terminal photosensing transistor functions as a photosensing resistor to produce a photosensing current according to an incident light, wherein the first node is charged by the photosensing current, such that the driving transistor is turned on to generate an output current to the corresponding output line.

7. The active photosensing array as claimed in claim 6, wherein during a reset cycle after the exposure and read out cycle is completed, the level of the corresponding selection line is pulled down to be lower than that of the first node and the two-terminal photosensing transistor functions as a diode to produce a diode current, such that the first node is discharged to turn off the driving transistor.

8. The active photosensing array as claimed in claim 5, wherein the two-terminal photosensing transistor is an N-type a-Si:H TFT.

9. A photosensing method for an active photosensing pixel, wherein the active photosensing pixel comprises a two-terminal photosensing transistor having a first terminal directly coupled to a first node, a second terminal coupled to a selection line and a control terminal directly connected to the first terminal, and a driving transistor having a first terminal coupled to a first reference voltage, a second terminal directly coupled to an output line and a control terminal directly connected to the first node, the active photosensing pixel further comprising:

a sensitivity control capacitor, having a first terminal directly connected to the first node and a second terminal connected to a second reference voltage which is different from the first reference voltage, comprising:

providing a first voltage to the selection line, during an exposure and readout cycle, such that the two-terminal photosensing transistor functions as a photosensing resistor; and generating a photosensing current to charge the first node when the two-terminal transistor receives an incident light, such that the driving transistor is turned on according to a voltage level of the first node to produce an output current to the output line.

10. The photosensing method as claimed in claim 9, further comprising, providing a second voltage to the selection line during a reset cycle after the exposure and readout cycle is completed, such that the two-terminal photosensing transistor functions as a diode to generate a diode current, and the first node is discharged to turn off the driving transistor according to the diode current.

11. The photosensing method as claimed in claim 9, wherein the first voltage is higher than that of the level of the first node.

12. The photosensing method as claimed in claim 10, wherein the second voltage is lower than that of the first node.

13. The photosensing method as claimed in claim 9, wherein the two-terminal photosensing transistor is an N-type a-Si:H TFT.

14. An active photosensing pixel, comprising:

a two-terminal photosensing transistor, having a first terminal coupled to a first node, a second terminal coupled to a selection line and a control terminal connected to the first terminal;

a driving transistor, having a first terminal coupled to a first reference voltage, a second terminal coupled to an output line and a control terminal connected to the first node, and wherein the selection line directly connected with the second terminal of the two-terminal photosensing transistor is further directly connected to a switch transistor of a display pixel, and the selection line provides a gate signal to the switch transistor of the display pixel.

15. The active photosensing pixel as claimed in claim 4, further comprising, a sensitivity control capacitor, having a first terminal connected to the first node and a second terminal connected to a second reference voltage.

16. The active photosensing pixel as claimed in claim 14, wherein, during an exposure and readout cycle, a level of the selection line is pulled up to be higher than that of the first node, and the two-terminal photosensing transistor functions as a photosensitive resistor to produce a photosensing current according to an incident light, wherein the first node is charged by the photosensing current, such that the driving transistor generates an output current to the output line.

17. The active photosensing pixel as claimed in claim 16, wherein during a reset cycle after the exposure and readout cycle is completed, the level of the selection line is pulled down to be lower than that of the first node and the two-terminal photosensing transistor functions as a diode to produce a diode current, such that the first node is discharged to turn off the driving transistor.

18. The active photosensing pixel as claimed in claim 14, wherein the two-terminal photosensing transistor is an N-type a-Si:H TFT.

19. An active photosensing array, comprising:

a plurality of selection lines;

a plurality of output lines; and a plurality of active photosensing pixels, each including:

a two-terminal photosensing transistor, having a first terminal coupled to a first node, a second terminal coupled to a corresponding selection line and a control terminal connected to the first terminal; and a driving transistor, having a first terminal coupled to a first reference voltage, a second terminal coupled to a corresponding output line and a control terminal connected to the first node, wherein the selection line directly connected with the second terminal of the two-terminal photosensing transistor is further directly connected to a switch transistor of a display pixel, and the selection line provides a gate signal to the switch transistor of the display pixel.

20. The active photosensing array as claimed in claim 19, wherein the active photosensing pixels each comprise a sensitivity control capacitor having a first terminal connected to the first node and a second terminal connected to a second reference voltage.

21. The active photosensing array as claimed in claim 19, wherein, during an exposure and readout cycle, a level of the corresponding selection line is pulled up to be higher than that of the level at the first node, and the two-terminal photosensing transistor functions as a photosensing resistor to produce a photosensing current according to an incident light, wherein the first node is charged by the photosensing current, such that the driving transistor is turned on to generate an output current to the corresponding output line.

22. The active photosensing array as claimed in claim 21, wherein during a reset cycle after the exposure and read out cycle is completed, the level of the corresponding selection line is pulled down to be lower than that of the first node and the two-terminal photosensing transistor functions as a diode to produce a diode current, such that the first node is discharged to turn off the driving transistor.

23. The active photosensing array as claimed in claim 19, wherein the two-terminal photosensing transistor is an N-type a-Si:H TFT.

24. A photosensing method for an active photosensing pixel, wherein the active photosensing pixel comprises a two-terminal photosensing transistor having a first terminal coupled to a first node, a second terminal coupled to a selection line and a control terminal connected to the first terminal, and a driving transistor having a first terminal coupled to a first reference voltage, a second terminal coupled to an output line and a control terminal connected to the first node, the selection line directly connected with the second terminal of the two-terminal photosensing transistor is directly connected to a switch transistor of a display pixel, comprising:

providing a first voltage to the selection line, during an exposure and readout cycle, such that the two-terminal photosensing transistor functions as a photosensing resistor;

generating a photosensing current to charge the first node when the two-terminal transistor receives an incident light, such that the driving transistor is turned on according to a voltage level of the first node to produce an output current to the output line; and providing a gate signal to the switch transistor of the display pixel by the selection line.

25. The photosensing method as claimed in claim 24, further comprising, providing a second voltage to the selection line during a reset cycle after the exposure and readout cycle is completed, such that the two-terminal photosensing transistor functions as a diode to generate a diode current, and the first node is discharged to turn off the driving transistor according to the diode current.

26. The photosensing method as claimed in claim 24, wherein the first voltage is higher than that of the level of the first node.

27. The photosensing method as claimed in claim 25, wherein the second voltage is lower than that of the first node.

28. The photosensing method as claimed in claim 24, wherein the two-terminal photosensing transistor is an N-type a-Si:H TFT.

* * * * *